US008829800B2

(12) United States Patent
Harris

(10) Patent No.: US 8,829,800 B2
(45) Date of Patent: Sep. 9, 2014

(54) LIGHTING COMPONENT WITH INDEPENDENT DC-DC CONVERTERS

(75) Inventor: Michael J. Harris, Cary, NC (US)

(73) Assignee: Cree, Inc., Durham, NC (US)

( * ) Notice: Subject to any disclaimer, the term of this patent is extended or adjusted under 35 U.S.C. 154(b) by 176 days.

(21) Appl. No.: 13/606,713

(22) Filed: Sep. 7, 2012

(65) Prior Publication Data

US 2014/0070710 A1 Mar. 13, 2014

(51) Int. Cl.
*H05B 33/08* (2006.01)

(52) U.S. Cl.
CPC ........ *H05B 33/0815* (2013.01); *H05B 33/0809* (2013.01)
USPC .......................... 315/185 R; 315/213; 315/220

(58) Field of Classification Search
None
See application file for complete search history.

(56) References Cited

U.S. PATENT DOCUMENTS

| | | | | |
|---|---|---|---|---|
| 7,187,136 B2 * | 3/2007 | Fiorello | ........................ | 315/224 |
| 7,888,881 B2 * | 2/2011 | Shteynberg et al. | .......... | 315/291 |
| 8,466,628 B2 * | 6/2013 | Shearer et al. | ............ | 315/209 R |
| 2007/0024213 A1 * | 2/2007 | Shteynberg et al. | .......... | 315/291 |
| 2007/0235639 A1 * | 10/2007 | Rains | ............................ | 250/228 |
| 2011/0006604 A1 | 1/2011 | Chang et al. | | |
| 2011/0248640 A1 * | 10/2011 | Welten | ........................... | 315/210 |
| 2012/0043912 A1 * | 2/2012 | Huynh et al. | ................. | 315/297 |
| 2012/0229041 A1 * | 9/2012 | Saes et al. | ................. | 315/200 R |

FOREIGN PATENT DOCUMENTS

EP     2213932 A1    8/2010

OTHER PUBLICATIONS

International Search Report and Written Opinion for PCT/US2013/058256, mailed Dec. 17, 2013, 9 pages.

* cited by examiner

*Primary Examiner* — Crystal L Hammond
(74) *Attorney, Agent, or Firm* — Withrow & Terranova, P.L.L.C.

(57) ABSTRACT

The present disclosure relates to a lighting component with multiple DC-DC converters. Each of the DC-DC converters is used to independently drive a corresponding string of LEDs. In general, rectifier circuitry receives an AC power signal and generates a rectified signal, which is provided to first and second converter circuitries. The first converter circuitry converts the rectified signal into a first drive voltage for a first string of LEDs and provides a first drive current for the first string of LEDs based on a first drive current control signal. Similarly, the second converter circuitry converts the rectified signal into a second drive voltage for a second string of LEDs and provides a second drive current for the second string of LEDs based on a second drive current control signal.

31 Claims, 14 Drawing Sheets

LIGHTING COMPONENT WITH INDEPENDENT DC-DC CONVERTERS

FIELD OF THE DISCLOSURE

The present disclosure relates to a solid-state lighting component with independent DC-DC converters.

BACKGROUND

In recent years, a movement has gained traction to replace incandescent light bulbs with lighting fixtures that employ more efficient lighting technologies. One such technology that shows tremendous promise employs light emitting diodes (LEDs). Compared with incandescent bulbs, LED-based light fixtures are much more efficient at converting electrical energy into light and are longer lasting, and as a result, lighting fixtures that employ LED technologies are expected to replace incandescent bulbs in residential, commercial, and industrial applications.

Unlike incandescent bulbs that operate by subjecting a filament to a desired current, LED-based lighting fixtures require electronics to drive one or more LEDs. The electronics generally include a power supply and circuitry to provide specially configured signals that are required to drive the one or more LEDs in a desired fashion. While currently much more efficient than incandescent bulbs, there is a continued effort to even further improve the efficiency of the LED-based lighting fixtures. As such, designers are constantly searching for ways to improve the efficiencies of both the electronics and the LEDs of the lighting fixture.

SUMMARY

The present disclosure relates to a lighting component with multiple DC-DC converters. Each of the DC-DC converters is used to independently drive a corresponding string of LEDs. In general, rectifier circuitry receives an AC power signal and generates a rectified signal, which is provided to first and second converter circuitries. The first converter circuitry converts the rectified signal into a first drive voltage for a first string of LEDs and provides a first drive current for the first string of LEDs based on a first drive current control signal. Similarly, the second converter circuitry converts the rectified signal into a second drive voltage for a second string of LEDs and provides a second drive current for the second string of LEDs based on a second drive current control signal. The LEDs in the second string of LEDs may be the same type as or a different type from those in the first string of LEDs.

The resultant light emitted from the first and second strings of LEDs may mix to form white light at a desired color temperature. In certain embodiments, there is only one DC-DC conversion between the rectifier circuitry and the first string of LEDs, and there is only one DC-DC conversion between the rectifier circuitry and the second string of LEDs. The respective DC-DC conversions are provided by respective first and second DC-DC converter circuitries.

The first and second DC-DC converter circuitries may provide buck, boost, or buck-boost type DC-DC converters. In a first embodiment, the first and second DC-DC converter circuitries may include boost type DC-DC converters. In a second embodiment, the first DC-DC converter circuitry may include a buck type DC-DC converter, and the second DC-DC converter circuitry may include a boost type DC-DC converter, or vice versa. In a third embodiment, the first and second DC-DC converter circuitries may include buck type DC-DC converters.

While any number of parallel converter stages and strings of LEDs may be supported, in one embodiment, the first string of LEDs includes multiple LEDs of a first color, and the second string of LEDs includes multiple LEDs of a second color that is different than the first color. For example, the LEDs of the first color may be red LEDs while the LEDs of the second color may be blue-shifted green LEDs, blue-shifted yellow LEDs, or a combination thereof.

The drive voltages for the different stings may be the same or different. Similarly, the drive currents provided to the different strings may be the same or different for the same or different drive voltages. The drive currents and voltages are independently controllable for each LED string. The first and second drive current signals may be independent, pulse width modulated signals, which may be in-phase with one another or out of phase with one another. In one embodiment, the first and second drive current signals are substantially 180 degrees out of phase with one another.

The lighting component may have current control circuitry associated with the first and second DC-DC converter circuitries. The first current control circuitry provides the first drive current control signal based on a first current control signal, which may be provided by main control circuitry. The second current control circuitry provides the second drive current control signal based on a second current control signal provided by the main control circuitry. In one embodiment, the first converter circuitry and the first control circuitry are integrated into a first converter module, and the second converter circuitry and the second control circuitry are integrated into a second converter module, wherein the first and second converter modules are separate from the main control circuitry. In another embodiment, the main control circuitry is able to generate the first and second drive current signals.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

It will be understood that relative terms such as "front," "forward," "rear," "below," "above," "upper," "lower," "horizontal," or "vertical" may be used herein to describe a relationship of one element, layer or region to another element, layer or region as illustrated in the figures. It will be understood that these terms are intended to encompass different orientations of the device in addition to the orientation depicted in the figures.

The present disclosure relates to a lighting component with multiple DC-DC converters. Each of the DC-DC converters is used to independently drive a corresponding string of LEDs. In general, rectifier circuitry receives an AC power signal and generates a rectified signal, which is provided to first and second converter circuitries. The first converter circuitry converts the rectified signal into a first drive voltage for a first string of LEDs and provides a first drive current for the first string of LEDs based on a first drive current control signal. Similarly, the second converter circuitry converts the rectified signal into a second drive voltage for a second string of LEDs and provides a second drive current for the second string of LEDs based on a second drive current control signal. The LEDs in the second string of LEDs may be the same type as or a different type from those in the first string of LEDs.

The resultant light emitted from the first and second strings of LEDs may mix to form white light at a desired color temperature. In certain embodiments, there is only one DC-DC conversion between the rectifier circuitry and the first string of LEDs, and there is only one DC-DC conversion between the rectifier circuitry and the second string of LEDs. The respective DC-DC conversions are provided by the respective first and second DC-DC converter circuitries. The first and second converter circuitries may provide buck, boost, or buck-boost type DC-DC converters.

Figure 1:
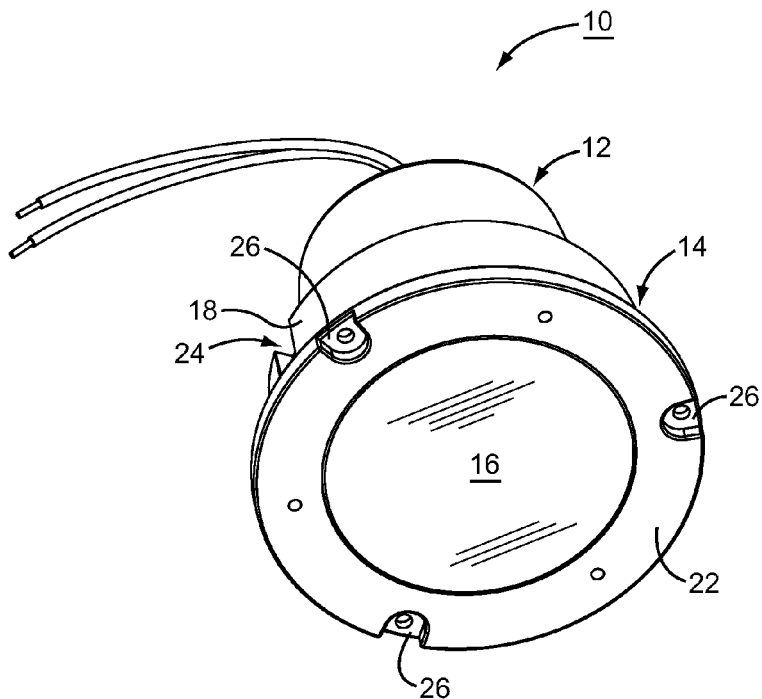
FIG. 1 is an isometric view of the front of an exemplary lighting fixture in which a lighting device according to one embodiment of the disclosure may be implemented.
Figure 2:
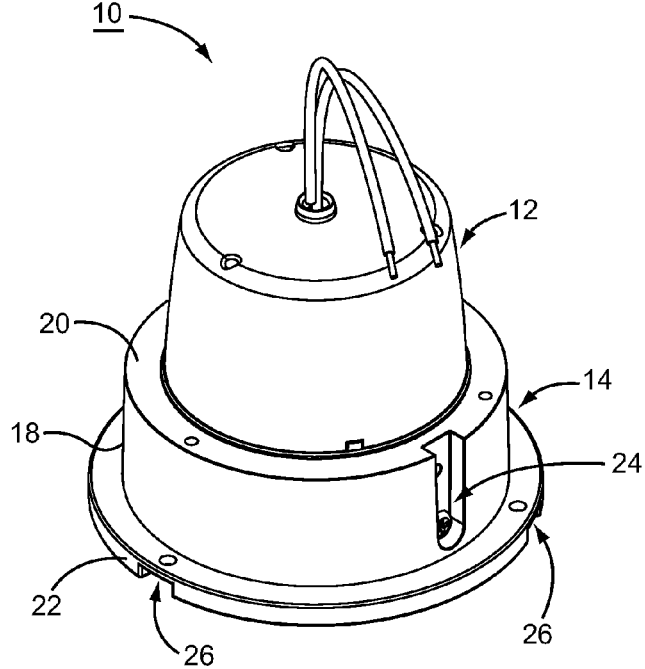
FIG. 2 is an isometric view of the back of the lighting fixture of FIG. 1.

For context and ease of understanding, the following description first describes an exemplary solid-state lighting fixture prior to describing how the solid-state lighting fixture may be configured to function as summarized above. With reference to FIGS. 1 and 2, a unique lighting fixture 10 is illustrated according to one embodiment of the present disclosure. While this particular lighting fixture 10 is used for reference, those skilled in the art will recognize that virtually any type of solid-state lighting fixture may benefit from the subject disclosure.

As shown, the lighting fixture 10 includes a control module 12, a mounting structure 14, and a lens 16. The illustrated mounting structure 14 is cup-shaped and is capable of acting as a heat spreading device; however, different fixtures may include different mounting structures 14 that may or may not act as heat spreading devices. A light source (not shown), which will be described in detail further below, is mounted inside the mounting structure 14 and oriented such that light is emitted from the mounting structure through the lens 16. The electronics (not shown) that are required to power and drive the light source are provided, at least in part, by the control module 12. While the lighting fixture 10 is envisioned to be used predominantly in 4, 5, and 6 inch recessed lighting applications for industrial, commercial, and residential applications; those skilled in the art will recognize that the concepts disclosed herein are applicable to virtually any size lighting device and any type of lighting application.

The lens 16 may include one or more lenses that are made of clear or transparent materials, such as polycarbonate or acrylic glass or any other suitable material. As discussed further below, the lens 16 may be associated with a diffuser for diffusing the light emanating from the light source and exiting the mounting structure 14 via the lens 16. Further, the lens 16 may also be configured to shape or direct the light exiting the mounting structure 14 via the lens 16 in a desired manner.

The control module 12 and the mounting structure 14 may be integrated and provided by a single structure. Alternatively, the control module 12 and the mounting structure 14 may be modular wherein different sizes, shapes, and types of control modules 12 may be attached, or otherwise connected, to the mounting structure 14 and used to drive the light source provided therein.

In the illustrated embodiment, the mounting structure 14 is cup-shaped and includes a sidewall 18 that extends between a bottom panel 20 at the rear of the mounting structure 14, and a rim, which may be provided by an annular flange 22 at the front of the mounting structure 14. One or more elongated slots 24 may be formed in the outside surface of the sidewall 18. There are two elongated slots 24, which extend parallel to a central axis of the lighting fixture 10 from the rear surface of the bottom panel 20 toward, but not completely to, the annular flange 22. The elongated slots 24 may be used for a variety of purposes, such as providing a channel for a grounding wire that is connected to the mounting structure 14 inside the elongated slot 24, connecting additional elements to the lighting fixture 10, or as described further below, securely attaching the lens 16 to the mounting structure 14.

The annular flange 22 may include one or more mounting recesses 26 in which mounting holes are provided. The mounting holes may be used for mounting the lighting fixture 10 to a mounting structure or for mounting accessories to the lighting fixture 10. The mounting recesses 26 provide for counter-sinking the heads of bolts, screws, or other attachment means below or into the front surface of the annular flange 22.

Figure 3:
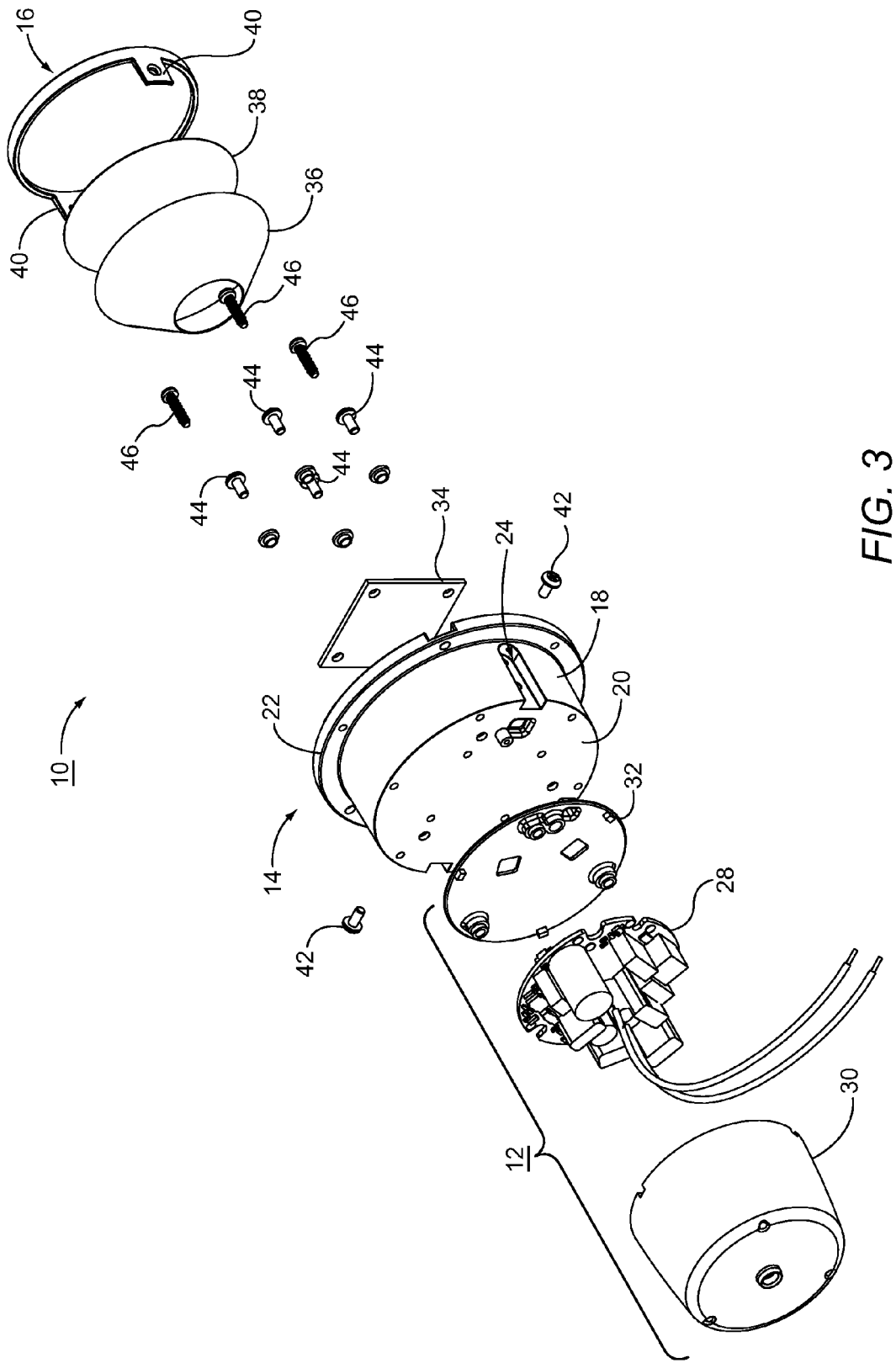
FIG. 3 is an exploded isometric view of the lighting fixture of FIG. 1.

With reference to FIG. 3, an exploded view of the lighting fixture 10 of FIGS. 1 and 2 is provided. As illustrated, the control module 12 includes control module electronics 28, which are encapsulated by a control module housing 30 and a control module cover 32. The control module housing 30 is cup-shaped and sized sufficiently to receive the control module electronics 28. The control module cover 32 provides a cover that extends substantially over the opening of the control module housing 30. Once the control module cover 32 is in place, the control module electronics 28 are contained within the control module housing 30 and the control module cover 32. The control module 12 is, in the illustrated embodiment, mounted to the rear surface of the bottom panel 20 of the mounting structure 14.

The control module electronics 28 may be used to provide all or a portion of power and control signals necessary to power and control the light source 34, which may be mounted on the front surface of the bottom panel 20 of the mounting structure 14 as shown, or in an aperture provided in the bottom panel 20 (not shown). Aligned holes or openings in the bottom panel 20 of the mounting structure 14 and the control module cover 32 are provided to facilitate an electrical connection between the control module electronics 28 and the light source 34. In an alternative embodiment (not shown), the control module 12 may provide a threaded base that is configured to screw into a conventional light socket wherein the lighting fixture resembles or is at least a compatible replacement for a conventional light bulb. Power to the lighting fixture 10 would be provided via this base.

In the illustrated embodiment, the light source 34 is solid state and employs light emitting diodes (LEDs) and associated electronics, which are mounted to a printed circuit board (PCB) to generate light at a desired color, intensity and color temperature. The LEDs are mounted on the front side of the PCB while the rear side of the PCB is mounted to the front surface of the bottom panel 20 of the mounting structure 14 directly or via a thermally conductive pad (not shown). In this embodiment, the thermally conductive pad has a low thermal resistivity, and therefore, efficiently transfers heat that is generated by the light source 34 to the bottom panel 20 of the mounting structure 14.

While various mounting mechanisms are available, the illustrated embodiment employs four bolts 44 to attach the PCB of the light source 34 to the front surface of the bottom panel 20 of the mounting structure 14. The bolts 44 screw into threaded holes provided in the front surface of the bottom panel 20 of the mounting structure 14. Three bolts 46 are used to attach the mounting structure 14 to the control module 12. In this particular configuration, the bolts 46 extend through corresponding holes provided in the mounting structure 14 and the control module cover 32 and screw into threaded apertures (not shown) provided just inside the rim of the control module housing 30. As such, the bolts 46 effectively sandwich the control module cover 32 between the mounting structure 14 and the control module housing 30.

A reflector cone 36 resides within the interior chamber provided by the mounting structure 14. In the illustrated embodiment, the reflector cone 36 has a conical wall that extends between a larger front opening and a smaller rear opening. The larger front opening resides at and substantially corresponds to the dimensions of front opening in the mounting structure 14 that corresponds to the front of the interior chamber provided by the mounting structure 14. The smaller rear opening of the reflector cone 36 resides about and substantially corresponds to the size of the LED or array of LEDs provided by the light source 34. The front surface of the reflector cone 36 is generally, but not necessarily, highly reflective in an effort to increase the overall efficiency and optical performance of the lighting fixture 10. In certain embodiments, the reflector cone 36 is formed from metal, paper, a polymer, or a combination thereof. In essence, the reflector cone 36 provides a mixing chamber for light emitted from the light source 34 and may be used to help direct or control how the light exits the mixing chamber through the lens 16.

Figure 4:
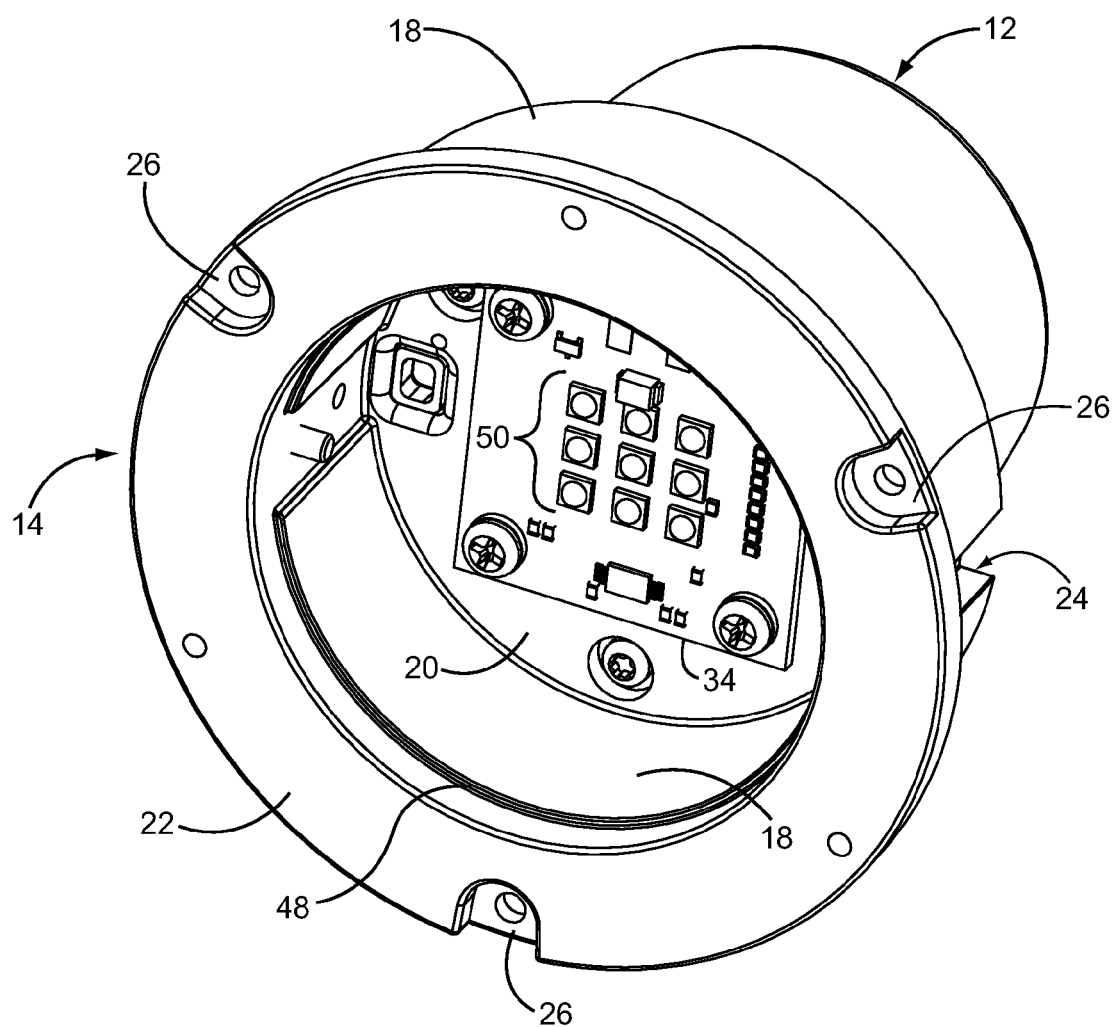
FIG. 4 is an isometric view of the front of the lighting fixture of FIG. 1 without the lens, diffuser, and reflector.
Figure 5:
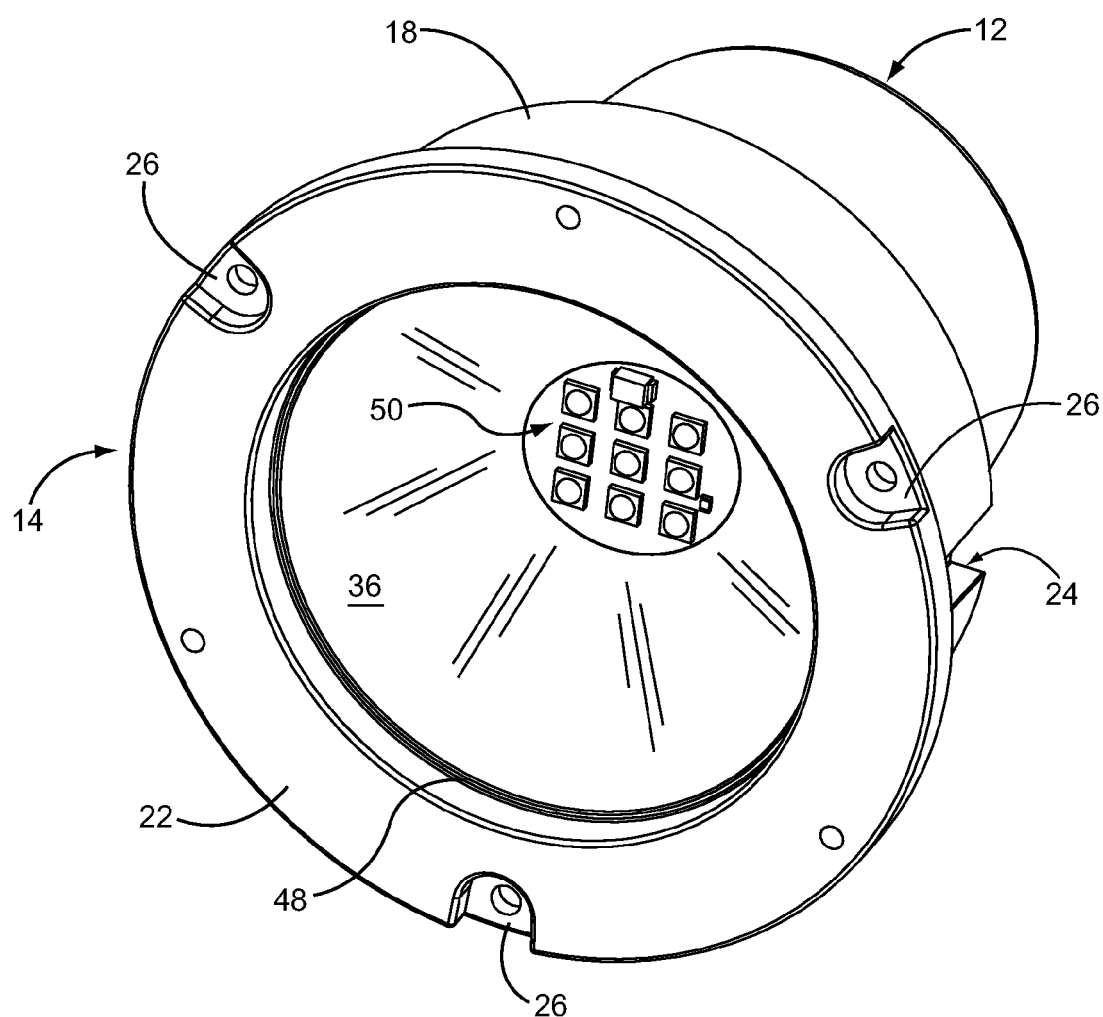
FIG. 5 is an isometric view of the front of the lighting fixture of FIG. 1 without the lens and diffuser.

When assembled, the lens 16 is mounted on or over the annular flange 22 and may be used to hold the reflector cone 36 in place within the interior chamber of the mounting structure 14 as well as hold additional lenses and one or more planar diffusers 38 in place. In the illustrated embodiment, the lens 16 and the diffuser 38 generally correspond in shape and size to the front opening of the mounting structure 14 and are mounted such that the front surface of the lens 16 is substantially flush with the front surface of the annular flange 22. As shown in FIGS. 4 and 5, a recess 48 is provided on the interior surface of the sidewall 18 and substantially around the opening of the mounting structure 14. The recess 48 provides a ledge on which the diffuser 38 and the lens 16 rest inside the mounting structure 14. The recess 48 may be sufficiently deep such that the front surface of the lens 16 is flush with the front surface of the annular flange 22.

Returning to FIG. 3, the lens 16 may include tabs 40, which extend rearward from the outer periphery of the lens 16. The tabs 40 may slide into corresponding channels on the interior surface of the sidewall 18 (see FIG. 4). The channels are aligned with corresponding elongated slots 24 on the exterior of the sidewall 18. The tabs 40 have threaded holes that align with holes provided in the grooves and elongated slots 24. When the lens 16 resides in the recess 48 at the front opening of the mounting structure 14, the holes in the tabs 40 will align with the holes in the elongated slots 24. Bolts 42 may be inserted through the holes in the elongated slots and screwed into the holes provided in the tabs 40 to affix the lens 16 to the mounting structure 14. When the lens 16 is secured, the diffuser 38 is sandwiched between the lens and the recess 48, and the reflector cone 36 is contained between the diffuser 38 and the light source 34. Alternatively, a retention ring (not shown) may attach to the flange 22 of the mounting structure 14 and operate to hold the lens 16 and diffuser 38 in place.

The degree and type of diffusion provided by the diffuser 38 may vary from one embodiment to another. Further, color, translucency, or opaqueness of the diffuser 38 may vary from one embodiment to another. Separate diffusers 38, such as that illustrated in FIG. 3, are typically formed from a polymer, glass, or thermoplastic, but other materials are viable and will be appreciated by those skilled in the art. Similarly, the lens 16 is planar and generally corresponds to the shape and size of the diffuser 38 as well as the front opening of the mounting structure 14. As with the diffuser 38, the material, color, translucency, or opaqueness of the lens 16 may vary from one embodiment to another. Further, both the diffuser 38 and the lens 16 may be formed from one or more materials or one or more layers of the same or different materials. While only one diffuser 38 and one lens 16 are depicted, the lighting fixture 10 may have multiple diffusers 38 or lenses 16.

For LED-based applications, the light source 34 provides an array of LEDs 50, as illustrated in FIG. 4. FIG. 4 illustrates a front isometric view of the lighting fixture 10, with the lens 16, diffuser 38, and reflector cone 36 removed, such that the light source 34 and the array of LEDs 50 are clearly visible within the mounting structure 14. FIG. 5 illustrates a front isometric view of the lighting fixture 10 with the lens 16 and diffuser 38 removed and the reflector cone 36 in place, such the array of LEDs 50 of the light source 34 are aligned with the rear opening of the reflector cone 36. As noted above, the volume inside the reflector cone 36 and bounded by the rear opening of the reflector cone 36 and the lens 16 or diffuser 38 provides a mixing chamber.

Figure 6:
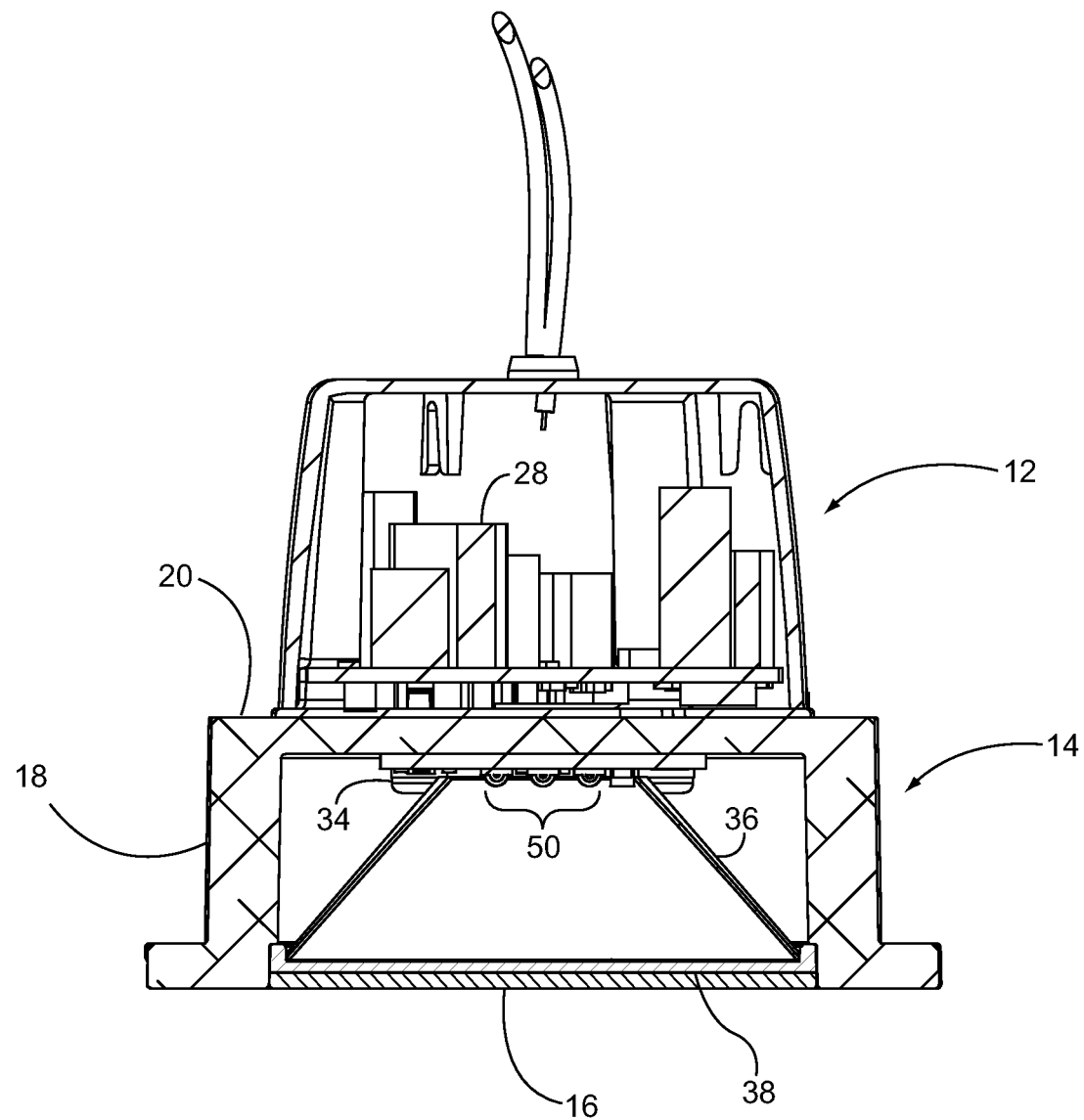
FIG. 6 is a cross sectional view of the lighting fixture of FIG. 5.

Light emitted from the array of LEDs 50 is mixed inside the mixing chamber formed by the reflector cone 36 (not shown) and directed out through the lens 16 in a forward direction to form a light beam. The array of LEDs 50 of the light source 34 may include LEDs 50 that emit different colors of light. For example, the array of LEDs 50 may include both red LEDs that emit reddish light and blue-shifted yellow (BSY) LEDs that emit bluish-yellow light or blue-shifted green (BSG) LEDs that emit bluish-green light, wherein the red and bluish-yellow or bluish-green light is mixed to form "white" light at a desired color temperature. In certain embodiments, the array of LEDs may include a large number of red LEDs and BSY or BSG LEDs in various ratios. For example, five or six BSY or BSG LEDs may surround each red LED, and the total number of LEDs may be 25, 50, 100, or more depending on the application. FIGS. 4, 5, and 6 only show 9 LEDs in the array of LEDs for clarity.

For a uniformly colored beam, relatively thorough mixing of the light emitted from the array of LEDs 50 is desired. Both the reflector cone 36 and the diffusion provided by the diffuser 38 play significant roles in mixing the light emanated from the array of LEDs 50 of the light source 34. In particular, certain light rays, which are referred to as non-reflected light rays, emanate from the array of LEDs 50 and exit the mixing chamber through the diffuser 38 and lens 16 without being reflected off of the interior surface of the reflector cone 36. Other light rays, which are referred to as reflected light rays, emanate from the array of LEDs 50 of the light source 34 and are reflected off of the front surface of the reflector cone 36 one or more times before exiting the mixing chamber through the diffuser 38 and lens 16. With these reflections, the reflected light rays are effectively mixed with each other and at least some of the non-reflected light rays within the mixing chamber before exiting the mixing chamber through the diffuser 38 and the lens 16.

As noted above, the diffuser 38 functions to diffuse, and as result mix, the non-reflected and reflected light rays as they exit the mixing chamber, wherein the mixing chamber and the diffuser 38 provide the desired mixing of the light emanated from the array of LEDs 50 of the light source 34 to provide a light beam of a consistent color. In addition to mixing light rays, the lens 16 and diffuser 38 may be designed and the reflector cone 36 shaped in a manner to control the relative concentration and shape of the resulting light beam that is projected from the lighting fixture 10. For example, a first lighting fixture 10 may be designed to provide a concentrated beam for a spotlight, wherein another may be designed to provide a widely dispersed beam for a floodlight. From an aesthetics perspective, the diffusion provided by the diffuser 38 also prevents the emitted light from looking pixelated and obstructs the ability for a user to see the individual LEDs of the array of LEDs 50.

As provided in the above embodiment, the more traditional approach to diffusion is to provide a diffuser 38 that is separate from the lens 16. As such, the lens 16 is effectively transparent and does not add any intentional diffusion. The intentional diffusion is provided by the diffuser 38. In most instances, the diffuser 38 and lens 16 are positioned next to one another as shown in FIG. 6. However, in other embodiments, the diffusion may be integrated into the lens 16 itself.

Figure 7:
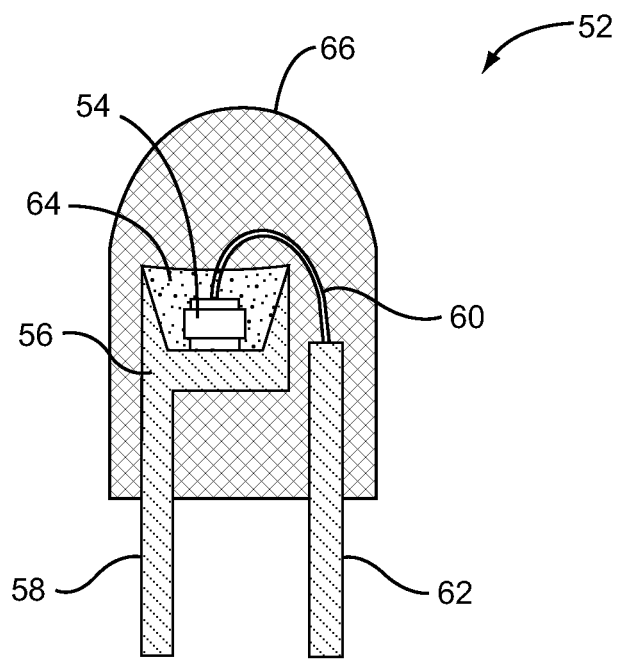
FIG. 7 is a cross-sectional view of a first type of LED architecture.

A traditional package for an LED 52 of the array of LEDs 50 is illustrated in FIG. 7. A single LED chip 54 is mounted on a reflective cup 56 using solder or a conductive epoxy, such that ohmic contacts for the cathode (or anode) of the LED chip 54 are electrically coupled to the bottom of the reflective cup 56. The reflective cup 56 is either coupled to or integrally formed with a first lead 58 of the LED 52. One or more bond wires 60 connect ohmic contacts for the anode (or cathode) of the LED chip 54 to a second lead 62.

The reflective cup 56 may be filled with an encapsulant material 64 that encapsulates the LED chip 54. The encapsulant material 64 may be clear or contain a wavelength conversion material, such as a phosphor, which is described in greater detail below. The entire assembly is encapsulated in a clear protective resin 66, which may be molded in the shape of a lens to control the light emitted from the LED chip 54.

Figure 8:
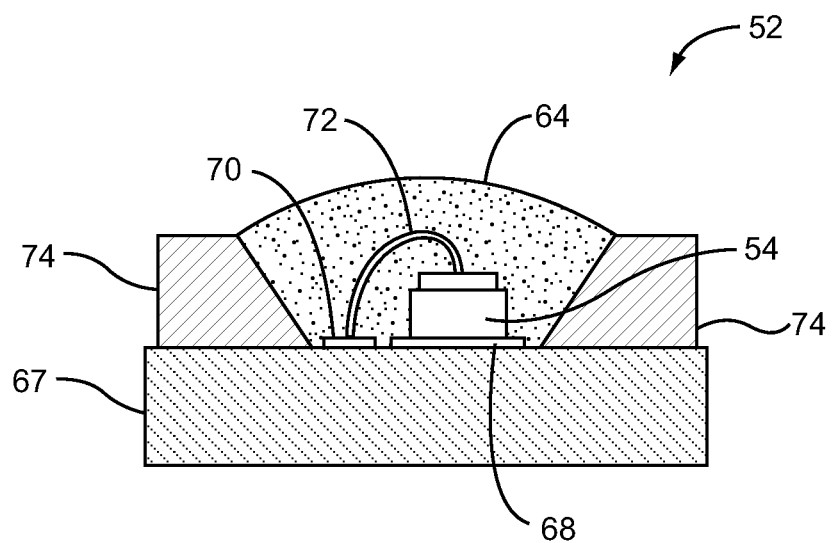
FIG. 8 is a cross-sectional view of a second type of LED architecture.

An alternative package for an LED 52 is illustrated in FIG. 8 wherein the LED chip 54 is mounted on a substrate 67. In particular, the ohmic contacts for the anode (or cathode) of the LED chip 54 are directly mounted to first contact pads 68 on the surface of the substrate 67. The ohmic contacts for the cathode (or anode) of the LED chip 54 are connected to second contact pads 70, which are also on the surface of the substrate 67, using bond wires 72. The LED chip 54 resides in a cavity of a reflector structure 74, which is formed from a reflective material and functions to reflect light emitted from the LED chip 54 through the opening formed by the reflector structure 74. The cavity formed by the reflector structure 74 may be filled with an encapsulant material 64 that encapsulates the LED chip 54. The encapsulant material 64 may be clear or contain a wavelength conversion material, such as a phosphor.

In either of the embodiments of FIGS. 7 and 8, if the encapsulant material 64 is clear, the light emitted by the LED chip 54 passes through the encapsulant material 64 and the protective resin 66 without any substantial shift in color. As such, the light emitted from the LED chip 54 is effectively the light emitted from the LED 52. If the encapsulant material 64 contains a wavelength conversion material, substantially all or a portion of the light emitted by the LED chip 54 in a first wavelength range may be absorbed by the wavelength conversion material, which will responsively emit light in a second wavelength range. The concentration and type of wavelength conversion material will dictate how much of the light emitted by the LED chip 54 is absorbed by the wavelength conversion material as well as the extent of the wavelength conversion. In embodiments where some of the light emitted by the LED chip 54 passes through the wavelength conversion material without being absorbed, the light passing through the wavelength conversion material will mix with the light emitted by the wavelength conversion material. Thus, when a wavelength conversion material is used, the light emitted from the LED 52 is shifted in color from the actual light emitted from the LED chip 54.

As noted above, the array of LEDs 50 may include a group of BSY or BSG LEDs 52 as well as a group of red LEDs 52. BSY LEDs 52 include an LED chip 54 that emits bluish light, and the wavelength conversion material is a yellow phosphor that absorbs the blue light and emits yellowish light. Even if some of the bluish light passes through the phosphor, the resultant mix of light emitted from the overall BSY LED 52 is yellowish light. The yellowish light emitted from a BSY LED 52 has a color point that falls above the Black Body Locus (BBL) on the 1931 CIE chromaticity diagram wherein the BBL corresponds to the various color temperatures of white light.

Similarly, BSG LEDs 52 include an LED chip 54 that emits bluish light; however, the wavelength conversion material is a greenish phosphor that absorbs the blue light and emits greenish light. Even if some of the bluish light passes through the phosphor, the resultant mix of light emitted from the overall BSG LED 52 is greenish light. The greenish light emitted from a BSG LED 52 has a color point that falls above the BBL on the 1931 CIE chromaticity diagram wherein the BBL corresponds to the various color temperatures of white light.

The red LEDs 52 generally emit reddish light at a color point on the opposite side of the BBL as the yellowish or greenish light of the BSY or BSG LEDs 52. As such, the reddish light from the red LEDs 52 mixes with the yellowish or greenish light emitted from the BSY or BSG LEDs 52 to generate white light that has a desired color temperature and falls within a desired proximity of the BBL. In effect, the reddish light from the red LEDs 52 pulls the yellowish or greenish light from the BSY or BSG LEDs 52 to a desired color point on or near the BBL. Notably, the red LEDs 52 may have LED chips 54 that natively emit reddish light wherein no wavelength conversion material is employed. Alternatively, the LED chips 54 may be associated with a wavelength conversion material, wherein the resultant light emitted from the wavelength conversion material and any light that is emitted from the LED chips 54 without being absorbed by the wavelength conversion material mixes to form the desired reddish light.

The blue LED chip 54 used to form either the BSY or BSG LEDs 52 may be formed from a gallium nitride (GaN), indium gallium nitride (InGaN), silicon carbide (SiC), zinc selenide (ZnSe), or like material system. The red LED chip 54 may be formed from an aluminum indium gallium nitride (AlInGaP), gallium phosphide (GaP), aluminum gallium arsenide (AlGaAs), or like material system. Exemplary yellow phosphors include cerium-doped yttrium aluminum garnet (YAG:Ce), yellow BOSE (Ba, O, Sr, Si, Eu) phosphors, and the like. Exemplary green phosphors include green BOSE phosphors, Lutetium aluminum garnet (LuAg), cerium doped LuAg (LuAg:Ce), Maui M535 from Lightscape Materials, Inc. of 201 Washington Road, Princeton, N.J. 08540, and the like. The above LED architectures, phosphors, and material systems are merely exemplary and are not intended to provide an exhaustive listing of architectures, phosphors, and materials systems that are applicable to the concepts disclosed herein.

Figure 9:
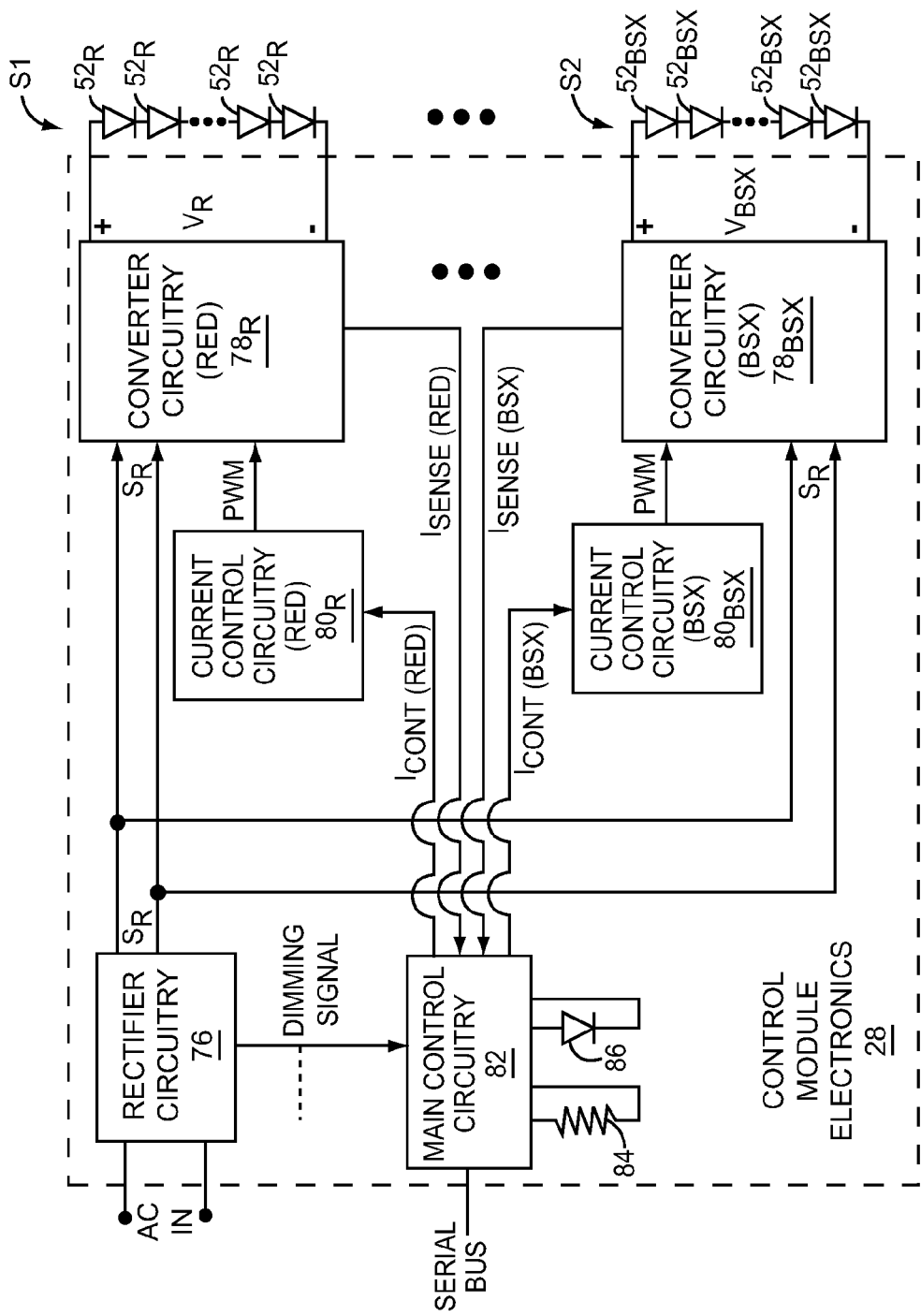
FIG. 9 is a schematic of exemplary control module electronics according to a first embodiment of the disclosure.

In a first embodiment, the control module electronics 28 for driving the array of LEDs 50 is illustrated in FIG. 9 according to one embodiment of the disclosure. As illustrated, the array of LEDs 50 may include a mixture of red LEDs 52 and either BSY or BSG LEDs 52. The array of LEDs 50 is electrically divided into two or more strings of series connected LEDs 52. As depicted, there are two LED strings S1 and S2. For clarity, the reference number "52" will include a subscript indicative of the color of the LED 52 in the following text where 'R' corresponds to red, 'BSY' corresponds to blue shifted yellow, 'BSG' corresponds to blue shifted green, and 'BSX' corresponds to either BSG or BSY LEDs. LED string S1 includes a number of red LEDs $52_R$ and LED string S2 includes a number of either BSY or BSG LEDs $52_{BSX}$. At a high level, the control module electronics 28 control the drive currents delivered to the respective LED strings S1 and S2 to set the intensity of the light emitted from the LEDs 52.

The ratio of current provided through the red LEDs $52_R$ of the first LED string S1 relative to the current provided through the BSY or BSG LEDs $52_{BSX}$ of the second LED string S2 may be adjusted to effectively control the relative intensities of the reddish light emitted from the red LEDs $52_R$ and the combined yellowish or greenish light emitted from the various BSY or BSG LEDs $52_{BSX}$. As such, the intensity and the color point of the yellowish or greenish light from BSY or BSG LEDs $52_{BSX}$ can be set relative the intensity of the reddish light emitted from the red LEDs $52_R$. The resultant yellowish or greenish light mixes with the reddish light to generate white light that has a desired color temperature and falls within a desired proximity of the BBL.

In particular, the control module electronics 28 depicted in FIG. 9 generally include rectifier circuitry 76, converter circuitry 78, current control circuitry 80, and main control circuitry 82. The rectifier circuitry 76 is adapted to receive an AC power signal (AC IN), rectify the AC power signal, and optionally correct the power factor of the AC power signal. The rectifier circuitry 76 may include a traditional diode bridge and associated filtering, such that if the AC power signal (AC IN) is a 60 Hertz, 120 volt AC signal, the output of the rectifier circuitry 76 may be a 120 Hertz, full-wave rectified signal $S_R$.

Each of the LED strings S1 and S2 is associated with independent converter circuitries $78_R$ and $78_{BSX}$. As illustrated, the first LED string S1 of red LEDs $52_R$ is driven with the converter circuitry $78_R$, and the second LED string S2 of BSY or BSG LEDs $52_{BSX}$ is driven with the converter circuitry $78_{BSX}$.

The rectified signal $S_R$ from the rectifier circuitry 76 supplies power to the respective conversion circuitries $78_R$ and $78_{BSX}$. The converter circuitries $78_R$ and $78_{BSX}$ include DC-DC converters, which operate in either continuous or discontinuous modes and may optionally provide power factor correction, if power factor correction is not provided in the rectifier circuitry 76. Each of the respective converter circuitries $78_R$ and $78_{BSX}$ may be independently controlled though a pulse-width modulated (PWM) or other signal that controls the switching rate of its DC-DC converter. For a PWM signal, the higher the duty cycle, the higher the effective drive current for the corresponding LED string S1 or S2, and vice versa. The actual drive current for the corresponding LED strings may also be a PWM signal where the LEDs 52 of the LED strings S1 or S2 are rapidly turned on and off with an intensity corresponding to the duty cycle of the PWM signal, a DC signal where the LEDs of the LED strings S1 or S2 remain on at an intensity corresponding to the drive current, or a combination thereof.

The current control circuitries $80_R$ and $80_{BSX}$ are each configured to receive a current control signal $I_{CONT}$ provided by the main control circuitry 82 and generate a PWM signal (PWM) to independently drive the corresponding converter circuitries $78_R$ and $78_{BSX}$, and thus, set the drive currents for the LED strings S1 and S2 based on the duty cycles of the respective PWM signals (PWM). The DC-DC converters provided in each of the converter circuitries $78_R$ and $78_{BSX}$ may take on the form of a boost converter, a buck converter, or a buck-boost converter. As those skilled in the art will appreciate, a boost converter provides a controllable output voltage that is higher than the input voltage, and a buck converter provides a controllable output voltage that is higher than the input voltage. A buck-boost converter may be dynamically configured to provide a controllable output voltage that is either higher than, lower than, or the same as the input voltage.

Accordingly, each of the converter circuitries $78_R$ and $78_{BSX}$ may be configured to provide different drive voltages $V_R$ and $V_{BSX}$ for the LED strings S1 and S2, respectively. The drive voltages $V_R$ and $V_{BSX}$ may be set based on the number of LEDs 52 in the respective LEDS strings S1 and S2 and the forward bias voltage drop associated with the LEDs 52. For example, the drive voltage $V_R$ provided for red LED string S1 may be significantly lower than the drive voltage $V_{BSX}$ for the BSY or BSG LED string S2. As such, the drive voltages $V_R$ and $V_{BSX}$ may be independently set for the respective LED strings S1 and S2 to help achieve higher efficiencies, greater lumen output, certain color performance, or the like.

In addition to the converter circuitries $78_R$ and $78_{BSX}$ being able to operate at different drive voltages $V_R$ and $V_{BSX}$, the converter circuitries $78_R$ and $78_{BSX}$ are able to provide different drive currents through the different LED strings S1 and S2. The drive currents may not only be set at different levels, but may also be modulated differently. For example, the drive currents provided by converter circuitries $78_R$ and $78_{BSX}$ may be in phase, partially out of phase, or 180 degrees out of phase with one another to aid in ripple reduction. Further, one drive current could be substantially DC while the other is pulse width modulated. If both drive currents are pulse width modulated, the drive currents may have different duty cycles.

The dedicated converter circuitries $78_R$ and $78_{BSX}$ provide tremendous flexibility in independently setting drive voltages $V_R$ and $V_{BSX}$ and drive currents for the different LED strings S1 and S2. As noted above, the current control circuitries $80_R$ and $80_{BSX}$ are configured to control their respective DC-DC converters with the PWM signal (PWM) in response to the corresponding current control signals $I_{CONT}$ that are provided by the main control circuitry 82. Thus, the main control circuitry 82 is able to independently set the drive currents for the different LED strings S1 and S2 to control the relative intensities of the red light emitted from the LED string S1 and the bluish-yellow or bluish-green light emitted from the LED string S2.

Having such independent control allows the main control circuitry 82 to dynamically control the overall intensity, color balance, color temperature, and the like of the resulting white light emitted from the lighting fixture 10. The control of light emitted from the individual LED strings S1 and S2 as well as the overall light emitted from the lighting fixture 10 may be provided in either an open-loop or closed-loop fashion. For example, the main control circuitry 82 may initially be configured with initial operating parameters, which set or dictate drive current types and levels, during manufacture. These parameters may be loaded though an appropriate communication interface, such as a serial bus interface. During operation, the various parameters may be monitored in real time and used to control or modify the drive currents. For example, converter circuitries $78_R$ and $78_{BSX}$ may be configured to monitor the drive currents through the respective LED strings S1 and S2 and provide sense signals $I_{SENSE\ (RED)}$ and $I_{SENSE\ (BSX)}$ back to the main control circuitry 82. These sense signals $I_{SENSE\ (RED)}$ and $I_{SENSE\ (BSX)}$ may be used to adjust the levels of the current control signals $I_{CONT\ (RED)}$ and $I_{CONT\ (BSX)}$ as necessary to maintain a desired light output from the respective LED strings S1 and S2 as well as the lighting fixture 10.

In lieu of or in addition to monitoring the drive currents for the LED strings S1 and S2 and relying on initial operating parameters, other sensors may be used to gather real time information that may aid the main control circuitry 82 in determining the proper drive currents for the LED strings S1 and S2. For example, one or more light sensors 86 may be used to monitor one or more characteristics of the overall light output of the lighting fixture 10 or the emitted light from either or both of the LED strings S1 and S2. These characteristics may include or bear on intensity, color, color temperature, and the like.

The main control circuitry 82 could also monitor the ambient temperature associated with the control module electronics 28, the LEDs 52, and the like and adjust the drive currents in one or both of the LED strings S1 and S2 based thereon. As illustrated, a temperature sensor 84, such as a thermistor or resistance temperature device (RTD), may be used by the main control circuitry 82 to monitor an ambient temperature. It is common for the light output of the different types of LEDs 52 to varying differently throughout a given temperature range.

In many instances, it is desirable to increase and decrease overall light output of the lighting fixture 10 in response to a dimming signal. The dimming signal may be a control signal that is separate from the AC power signal AC IN or may be derived by the rectifier circuitry in response to changes in the AC power signal. In the latter instance, the AC power signal may be provided by a conventional TRIAC-based dimmer circuit. The main control circuitry 82 may set the drive currents in the LED strings S1 and S2 based on the level of dimming determined by the dimming signal alone or in combination with any of the various operating parameters, monitored light output, ambient temperature, actual drive currents $I_{SENSE}$, or the like. For example, the main control circuitry 82 may dim the overall light output from the lighting fixture 10 and have the emitted light maintain a given color temperature or change the color temperature in a fashion analogous to how an incandescent bulb changes color temperature as it is dimmed.

Figure 10A:
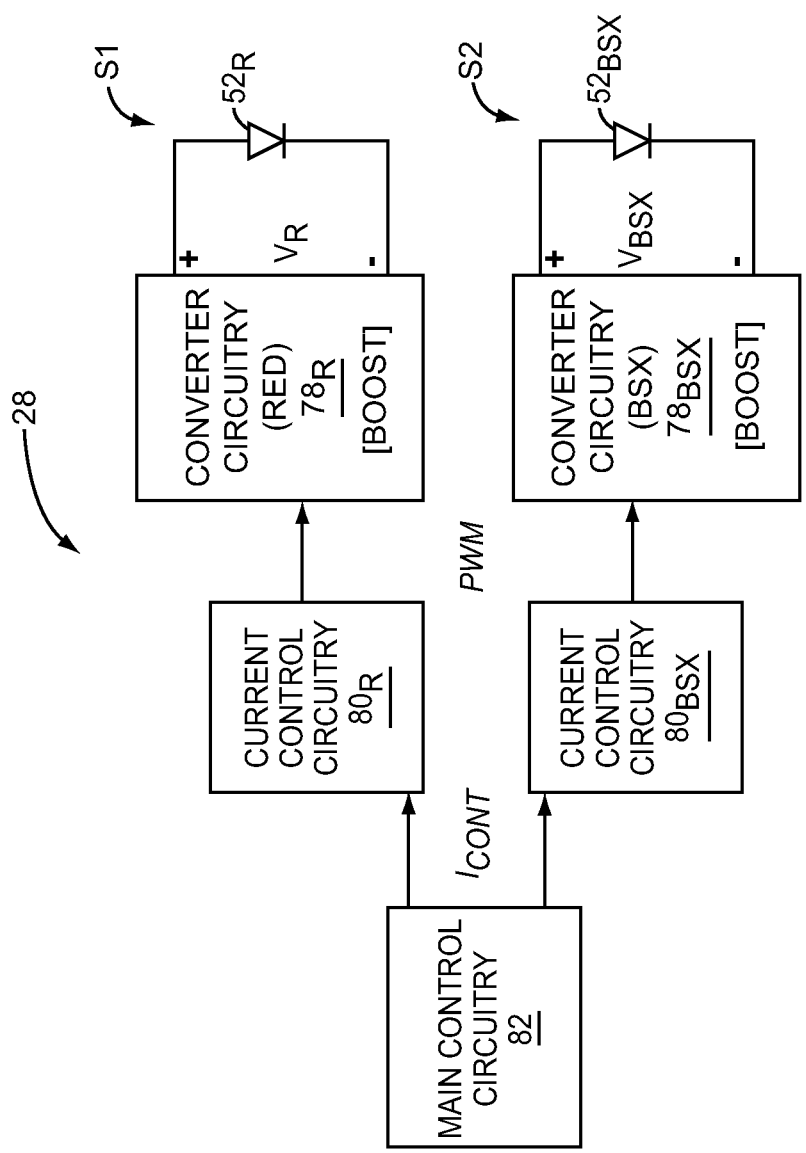
FIG. 10A is a schematic of the exemplary control module electronics of FIG. 9 wherein a first converter circuitry that drives a first LED string of a first type includes a boost converter and a second converter circuitry that drives a second LED string of a second type includes a boost converter.

With reference to FIGS. 10A-10D, various configurations for the control module electronics 28 are illustrated. These various embodiments highlight the different DC-DC converter configurations for the respective converter circuitries $78_R$ and $78_{BSX}$. Turning now to FIG. 10A, the DC-DC converter circuitries $78_R$ and $78_{BSX}$ are boost-type DC-DC converters, and the respective drive voltages $V_R$ and $V_{BSX}$ that are used to drive the respective LED strings S1 and S2 may be set to the same or different voltages during operation. Again, the drive currents provided by the respective converter circuitries $78_R$ and $78_{BSX}$ are independent and are ultimately controlled by the main control circuitry 82 via the respective current control circuitries $80_R$ and $80_{BSX}$.

Figure 10B:
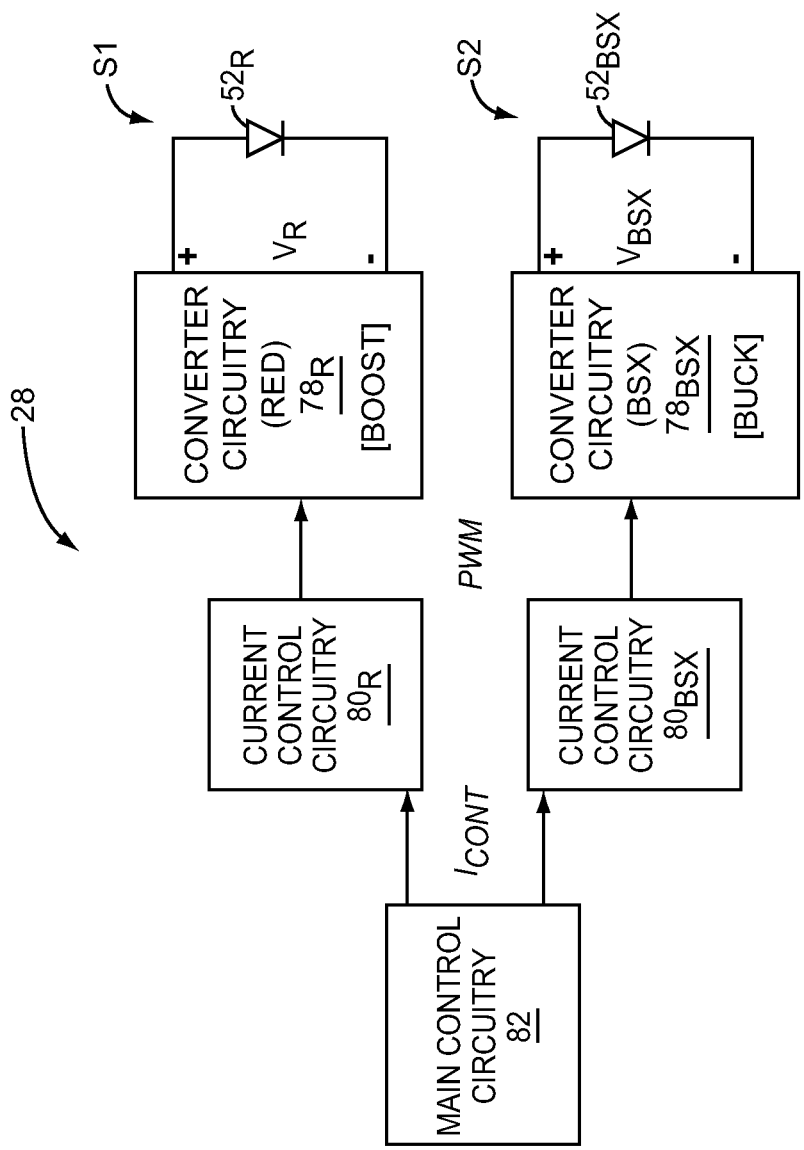
FIG. 10B is a schematic of the exemplary control module electronics of FIG. 9 wherein a first converter circuitry that drives a first LED string of a first type includes a boost converter and a second converter circuitry that drives a second LED string of a second type includes a buck converter.
Figure 10C:
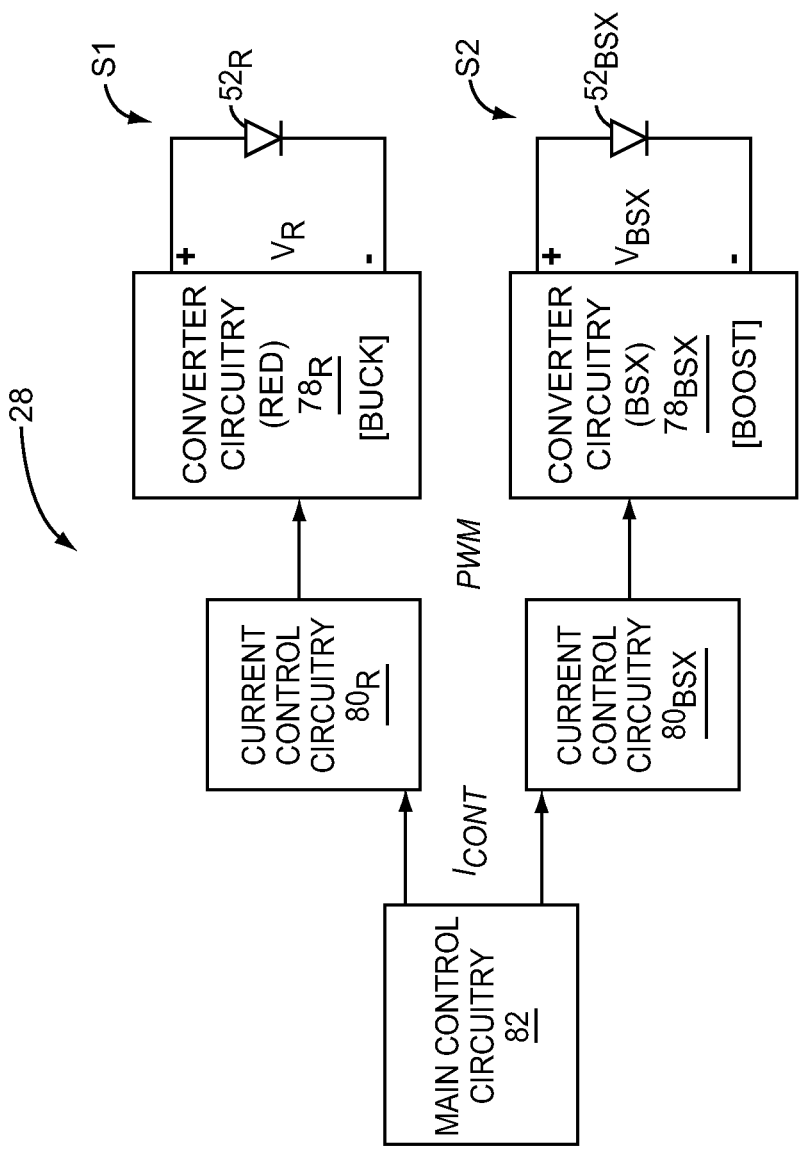
FIG. 10C is a schematic of the exemplary control module electronics of FIG. 9 wherein a first converter circuitry that drives a first LED string of a first type includes a buck converter and a second converter circuitry that drives a second LED string of a second type includes a boost converter.
Figure 10D:
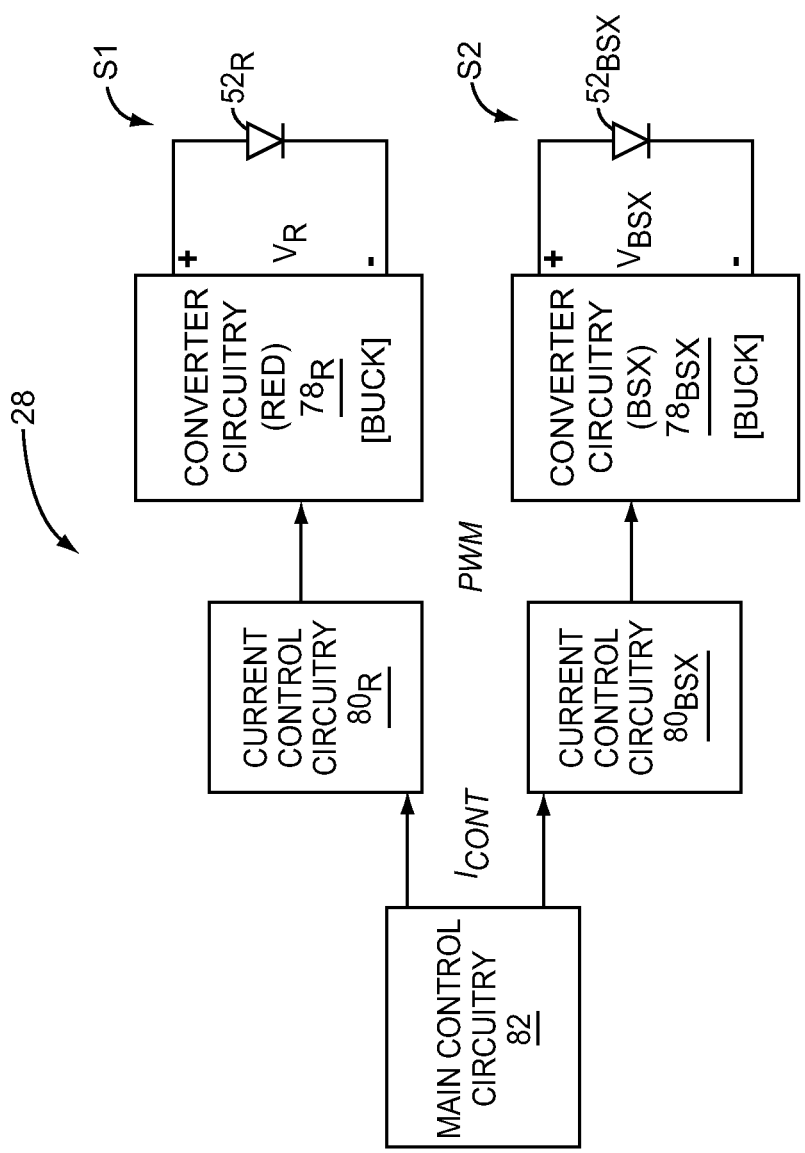
FIG. 10D is a schematic of the exemplary control module electronics of FIG. 9 wherein a first converter circuitry that drives a first LED string of a first type includes a buck converter and a second converter circuitry that drives a second LED string of a second type includes a buck converter.

FIG. 10B illustrates an architecture wherein the converter circuitry $78_R$ employs a boost-type DC-DC converter, while the converter circuitry $78_{BSX}$ employs a buck-type DC-DC converter. In an opposite fashion, FIG. 10C illustrates an embodiment wherein the converter circuitry $78_R$ employs a buck-type DC-DC converter, while the converter circuitry $78_{BSX}$ employs a boost-type DC-DC converter. Being able to implement independent converter circuitries $78_R$ and $78_{BSX}$ and employ different types of DC-DC converter architectures provides abundant flexibility in setting the drive voltages $V_R$ and $V_{BSX}$, respectively, for a wide range of LED string configurations. FIG. 10D illustrates an embodiment wherein both converter circuitries $78_R$ and $78_{BSX}$ employ buck-type DC-DC converters.

Figure 11:
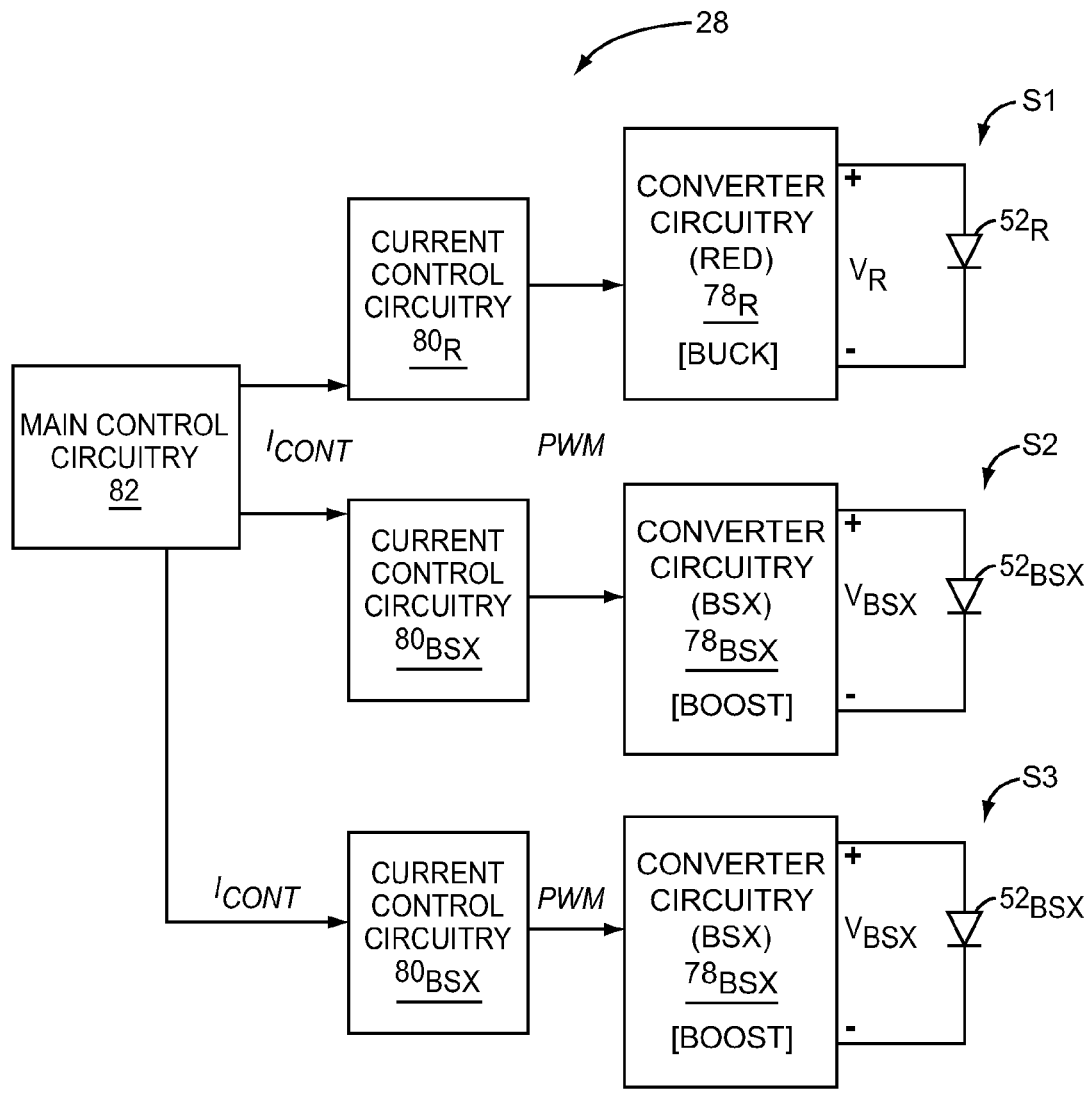
FIG. 11 is a schematic of a variation of the exemplary control module electronics of FIG. 9 wherein a first converter circuitry that drives a first LED string of a first type includes a buck converter, a second converter circuitry that drives a second LED string of a second type includes a boost converter, and a third converter circuitry that drives a third LED string of a second type includes a boost converter

While the embodiments of FIG. 9 and FIGS. 10A-10D only illustrate two independent converter circuitries $78_R$ and $78_{BSX}$, the concepts of providing independently controlled converter circuitries 78 for multiple LED strings is applicable to any number of LED strings. For example, FIG. 11 illustrates an embodiment wherein there are independent LED strings S1, S2, and S3. LED string S1 includes red LEDs $52_R$, LED string S2 includes a first string of BSY or BSG LEDs $52_{BSX}$, and LED string S3 includes a second string of BSY or BSG LEDs $52_{BSX}$. The LED strings S2 and S3 may include the same or different types of BSY or BSG LEDs $52_{BSX}$. Each of the LED strings S1, S2, and S3 may have its own converter circuitry 78 and current control circuitry 80. Each converter circuitry 78 is driven by a corresponding current control circuitry 80. The main control circuitry 82 is capable of controlling each of the current control circuitries 80 in an independent fashion, such that the drive currents provided in each of the LED strings S1, S2, and S3 are independently controlled. As illustrated, the converter circuitry $78_R$ for the red LED string S1 employs a buck-type DC-DC converter, while the converter circuitries $78_{BSX}$ that are used to drive the BSY or BSG LED strings S2 and S3 employ boost-type DC-DC converters. However, it is contemplated that any combination of buck-type or boost-type converters may be employed in any number of converter circuitries 78.

Figure 12:
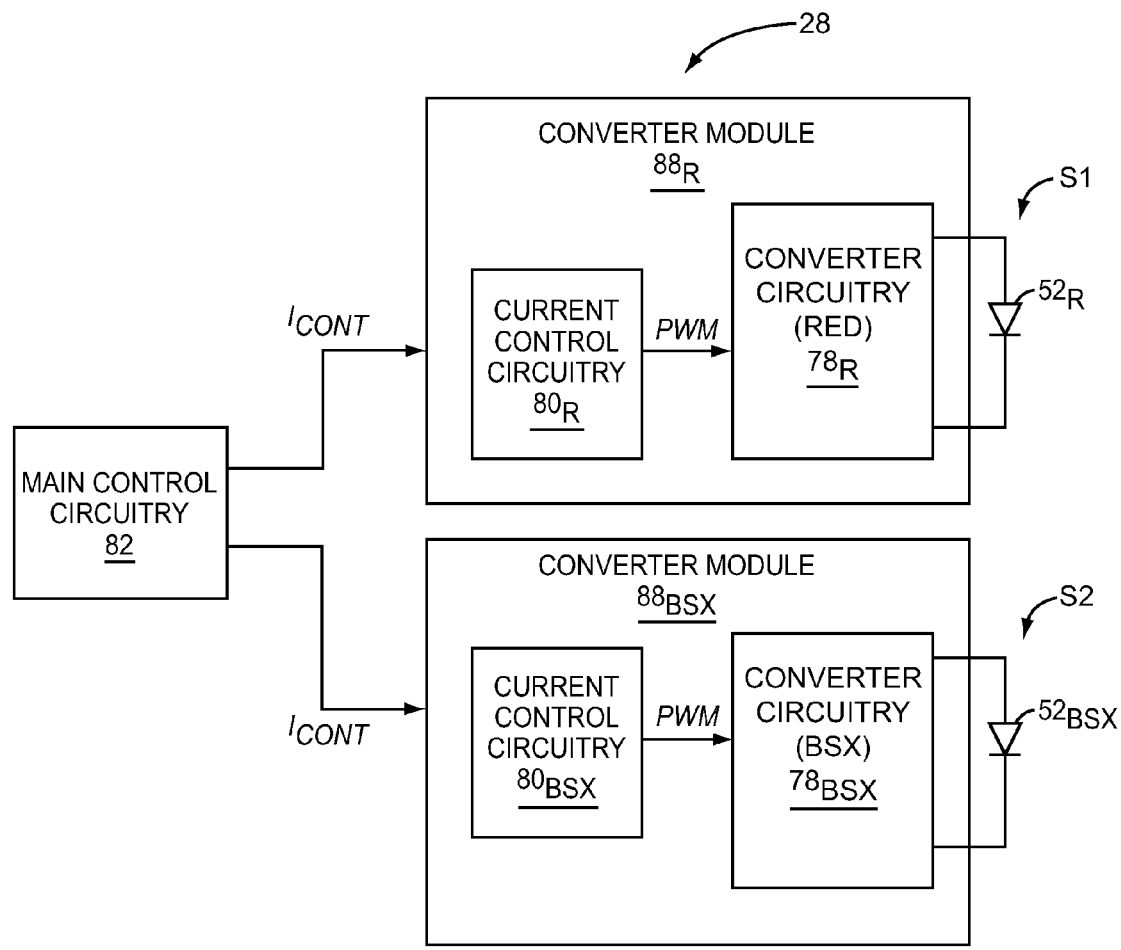
FIG. 12 is a schematic of control module electronics wherein the converter circuitry for a given string of LEDs is integrated with current control circuitry that controls the converter circuitry in a converter module.

The control module electronics 28 may be implemented in various ways. As illustrated in FIG. 12, the current control circuitry 80 and converter circuitry 78 for each LED string S1 and S2 may be integrated in a converter module 88. The converter module 88 may be formed in a separate integrated circuit from the main control circuitry 82. As illustrated, the red LED string S1 has a red converter module $88_R$, which includes the current control circuitry $80_R$ and the converter circuitry $78_R$. A similar converter module $88_{BSX}$ is provided for the BSY or BSG LED string S2. This converter module $88_{BSX}$ will include the current control circuitry $80_{BSX}$ and the converter circuitry $78_{BSX}$. In yet another embodiment, which is not specifically illustrated, the current control circuitry 80 and the converter circuitry 78 of the various converter modules 88 may be implemented in an integrated device, which is separate from the main control circuitry 82.

Figure 13:
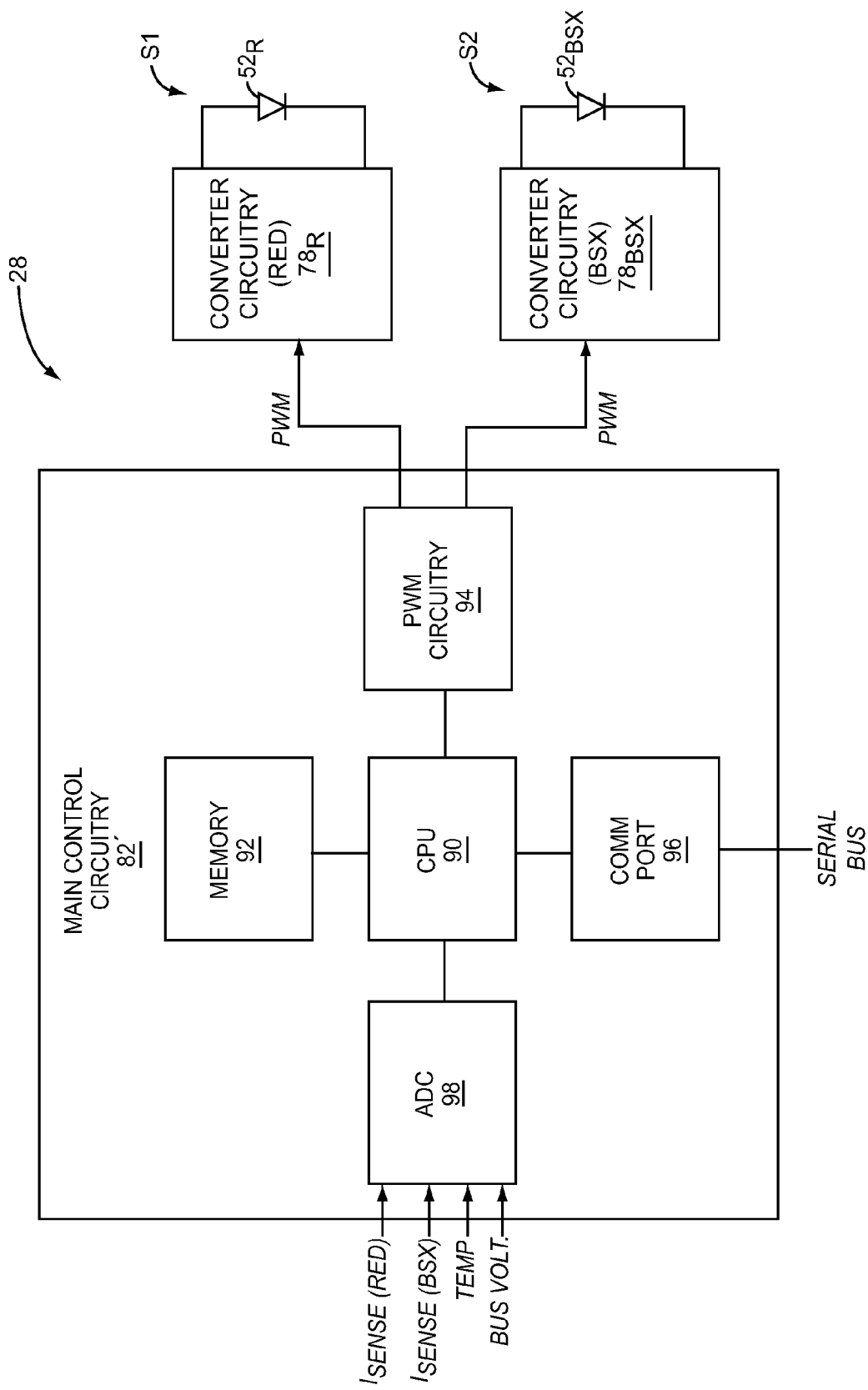
FIG. 13 is a schematic of control module electronics wherein the current control circuitry that controls the converter circuitry is integrated in main control circuitry, which is separate from the converter circuitry.

In an alternative configuration, the current control circuitry 80 may be implemented in the main control circuitry 82', as illustrated in FIG. 13. In this instance, the main control circuitry 82' will include a central processing unit (CPU) 90, which is associated with memory 92, pulse width modulation (PWM) circuitry 94, a communication port 96, and an analog-to-digital converter (ADC) 98. The CPU 90, based on programming instructions in memory 92, may cooperate with and control the PWM circuitry 94 to provide the PWM signals (PWM) to the respective converter circuitry 78 in an independent fashion. As illustrated, the communication port 96 may facilitate a serial bus through which initial operating parameters may be received as well as any other inputs that may affect operation of the main control circuitry 82' during initial configuration or throughout the life of the lighting fixture 10. The ADC 98 may be configured to receive various analog signals, such as those related to ambient temperature (TEMP), bus voltages (BUS VOLT), and the respective sense signals $I_{SENSE(RED)}$ and $I_{SENSE(BSX)}$, which correspond to drive currents in respective LED strings S1 and S2.

Those skilled in the art will recognize improvements and modifications to the embodiments of the present disclosure. All such improvements and modifications are considered within the scope of the concepts disclosed herein and the claims that follow.

What is claimed is:
1. A system comprising:
    rectifier circuitry adapted to receive an AC power signal and provide a rectified signal;
    first converter circuitry adapted to convert the rectified signal into a first drive voltage for a first string of LEDs and provide a first drive current for the first string of LEDs based on a first drive current control signal; and
    second converter circuitry adapted to convert the rectified signal into a second drive voltage for a second string of LEDs and provide a second drive current for the second string of LEDs based on a second drive current control signal.

2. The system of claim 1 wherein the first converter circuitry comprises a boost type DC-DC converter and the second converter circuitry comprises a boost type DC-DC converter.

3. The system of claim 1 wherein the first converter circuitry comprises a buck type DC-DC converter and the second converter circuitry comprises a boost type DC-DC converter.

4. The system of claim 1 wherein the first converter circuitry comprises a buck type DC-DC converter and the second converter circuitry comprises a buck type DC-DC converter.

5. The system of claim 1 wherein at least one of the first and second converter circuitries comprises a buck-boost type DC-DC converter.

6. The system of claim 1 wherein the first converter circuitry comprises a first DC-DC converter and the second converter circuitry comprises a second DC-DC converter, which is independent of the first DC-DC converter.

7. The system of claim 1 wherein the first string of LEDs comprises a plurality of LEDs of a first color and the second string of LEDs comprises a plurality of LEDs of a second color that is different than the first color.

8. The system of claim 7 wherein the plurality of LEDs of the first color are red LEDs and the plurality of LEDs of the second are at least one of blue-shifted green and blue-shifted yellow LEDs.

9. The system of claim 7 wherein the first drive voltage is different than the second drive voltage.

10. The system of claim 9 wherein the first drive current is different than the second drive current.

11. The system of claim 1 wherein the first drive current is different than the second drive current.

12. The system of claim 1 wherein the first drive current is controlled independently of the second drive current.

13. The system of claim 1 further comprising first current control circuitry adapted to provide the first drive current control signal based on a first current control signal provided by main control circuitry, and second current control circuitry adapted to provide the second drive current control signal based on a second current control signal provided by the main control circuitry.

14. The system of claim 13 wherein the first converter circuitry and the first control circuitry are integrated into a first converter module, and the second converter circuitry and the second control circuitry are integrated into a second converter module such that first and second converter modules are separate from the main control circuitry.

15. The system of claim 1 further comprising main control circuitry adapted to generate the first drive current control signal and the second drive current control signal.

16. The system of claim 1 where the first drive current control signal and the second drive current control signal are independent, pulse width modulated signals.

17. The system of claim 16 wherein the first drive current control signal is not in phase with the second drive current control signal.

18. The system of claim 16 wherein the first drive current control signal is substantially 180 degrees out of phase with the second drive current control signal.

19. The system of claim 1 wherein the first string of LEDs comprises a first type of LEDs and the second string of LEDs comprising a second type of LEDs, which is different from the first type of LEDs.

20. The system of claim 18 wherein any resultant light emitted from the first and second strings of LEDs is mixed to form white light at a desired color temperature, there is only one DC-DC conversion between the rectifier circuitry and the first string of LEDs, and there is only one DC-DC conversion between the rectifier circuitry and the second string of LEDs.

21. The system of claim 18 wherein the first and second drive currents are independently controlled such that any resultant light emitted from the first and second strings of LEDs is mixed to form white light at a desired color temperature.

22. The system of claim 1 wherein the first and second drive currents are independently controlled such that any resultant light emitted from the first and second strings of LEDs is dimmed to a desired intensity based on a dimming signal.

23. The system of claim 1 further comprising a main control system wherein the first and second drive currents are independently controlled such that any resultant light emitted from the first and second strings of LEDs is dimmed to a desired intensity based on a dimming signal.

24. A system comprising:
   rectifier circuitry adapted to receive an AC power signal and provide a rectified signal;
   first current control circuitry and second current control circuitry;
   first converter circuitry adapted to convert the rectified signal into a first drive voltage for a first string of LEDs of a first type and provide a first drive current for the first string of LEDs based on a first drive current control signal provided by the first current control circuitry; and
   second converter circuitry adapted to convert the rectified signal into a second drive voltage for a second string of LEDs of a second type and provide a second drive current for the second string of LEDs based on a second drive current control signal provided by the second current control circuitry, wherein there is only one DC-DC conversion between the rectifier circuitry and the first string of LEDs, and there is only one DC-DC conversion between the rectifier circuitry and the second string of LEDs.

25. The system of claim 24 wherein the first drive current is different than the second drive current.

26. The system of claim 25 wherein the first drive voltage is different than the second drive voltage.

27. The system of claim 26 wherein the first drive current is different than the second drive current.

28. The system of claim 24 wherein the first converter circuitry comprises a boost type DC-DC converter and the second converter circuitry comprises a boost type DC-DC converter.

29. The system of claim 24 wherein the first converter circuitry comprises a buck type DC-DC converter and the second converter circuitry comprises a boost type DC-DC converter.

30. The system of claim 24 wherein the first converter circuitry comprises a buck type DC-DC converter and the second converter circuitry comprises a buck type DC-DC converter.

31. The system of claim 24 wherein at least one of the first and second converter circuitries comprises a buck-boost type DC-DC converter.

* * * * *